3,236,685
PROCESS FOR TREATING TEXTILE FIBERS AND OTHER SHAPED PRODUCTS WITH COATINGS
John R. Caldwell and Russell Gilkey, Kingsport, Tenn., assignors to Eastman Kodak Company, Rochester, N.Y., a corporation of New Jersey
No Drawing. Filed June 20, 1962, Ser. No. 203,696
15 Claims. (Cl. 117—138.8)

This invention concerns the treatment of shaped articles, such as films, sheets, plates and filamentary materials of a hydrophobic nature so as to give them a durable, hydrophilic, antistatic and antisoiling finish.

Hydrophobic materials, when formed into shaped articles of various types, tend to accumulate static charges. These charges are particularly evident in the preparation of fibers and the subsequent manufacture into textile articles. As a result of formation of these static charges, the materials have been found unsuited for certain purposes and somewhat unsatisfactory for garments. Therefore, it has been desirable to provide a treatment for hydrophobic materials which would dissipate the static charges, but which would not subsequently impair such critical properties of the garment as tensile strength, flexibility, elongation, resistance to chemical, bacterial, and fungal agencies, and dyeability. It is also important to give the textiles a hydrophilic surface particularly in fabrics used in the manufacture of undergarments, for instance, where rapid transmission of perspiration is an asset.

The treatment should be applicable to all types of textiles made from both natural materials such as cotton, wool, and the like as well as a wide variety of synthetic materials including such polymers as polyesters, polyamides, polyurethanes, polyacrylics, polyolefins, and the like.

We have discovered that a coating of a polymeric polybasic acid can be applied to the shaped hydrophobic article and part of the coating cross-linked with a polyol or an epoxide by formation of ester linkages to provide a hydrophilic insoluble coating having excellent antistatic and antisoiling properties.

Fabrics treated in accordance with this invention demonstrate the ability of preventing pick-up of oily dirt during laundering. This is a desirable property, particularly in regard to the soiling properties such as are encountered with polyester type materials. While we do not desire to be bound by any theory concerning the mechanism of the coatings of this invention, this antisoiling property which is imparted to polyesters is probably associated with a certain degree of substantivity of these fibers for oils. The hydrophilic layer of our polymeric polybasic acid coating prevents the deposition of oily dirt either by charge effect or degree of polarity.

One object of this invention is to provide a finish for hydrophobic shaped articles which does not alter the basic physical properties but gives them an antistatic hydrophilic surface. Another object is to provide a durable antistatic finish for textile and other shaped products. A further object of the invention is to bond a polybasic acid polymer to the surface of a shaped article while at the same time causing partial chemical reaction to occur which insolubilizes the polymeric coating without destroying its hydrophilic characteristics. A still further object of the invention is to provide wettable finishes for textile products, which finishes are further characterized by possessing antisoiling properties. Additional objects would be apparent from the disclosure contained herein.

The above objects are obtained by coating polymeric polybasic acids on the shaped article. The polymeric polybasic acids, which may be employed in the process of our invention, can contain carboxyl (—COOH), sulfonic (—$SO_3H$), and/or phosphoric (—$PO_4H_2$) groups. Preferably, at least 10% of the acidic groups should be carboxyl. These acidic groups may be attached to a carbon chain backbone derived from a polymerizable aliphatic mono- or poly-carboxylic acid, e.g. acrylic acid, fumaric acid, maleic acid, itaconic acid, methacrylic acid, α-chloroacrylic acid, etc. Interpolymers of monocarboxylic acids with polymerizable vinyl or vinylidene monomers, e.g. interpolymers of acrylic acid wtih methacrylate, vinylacetate, vinylidene chloride, styrene, or the like may also be used. Also suitable are hydrolyzed, alcoholized or aminolized interpolymers of α,β-ethylenically-unsaturated dicarboxylic acid anhydrides, such as maleic anhydride, with polymerizable vinyl or vinylidene monomers. Similar polymeric polybasic products can be obtained from a polymeric derivative of the polybasic acid such as the ester, amide, nitrile, etc. by hydrolysis or other reaction which generates the acidic function.

Another method of forming polymeric polybasic acids is to react a polymeric material containing reactive functional groups with a compound which retains at least one acidic group after the reaction. The esterification of polyvinyl alcohol with a polycarboxylic acid is illustrative of this method. Polymers or copolymers derived from addition or condensation monomers need contain only acidic functional groups. However, other groups may be present and in certain applications, it may be quite desirable to include other hydrophilic groups such as hydroxy, amide, ether, etc. It may also be desirable in certain applications to include non-polar linkages to improve the flexibility of the coating.

In our preferred embodiment, the ratio of carbon atoms to acidic groups in the repeat unit of the polymeric polybasic acid should be from 2:1 to 10:1 and may be from 2:1 to 20:1. Atoms other than carbon can also be present in the backbone or on side groups of the polymeric chain. These polymeric materials should have a molecular weight of at least 500 and preferably 50,000–750,000 or higher. The higher molecular weight products in general give coats that are more flexible and adherent.

The polymeric polybasic acids used in our process should be soluble in a volatile solvent, preferably water. It will be appreciated that the low-boiling alcohols, ketones, ethers, and esters may be used alone or in conjunction with water, depending upon the method of application.

The polyols suitable for use in the process of this invention include any of the di- or polyfunctional hydroxy compounds or polymeric compounds which are water soluble, stable at temperatures up to 120° C. or above and which will react with a carboxylic acid or other acidic group, on heating, to form an ester. Typical examples are pentaerythritol, dipentaerythritol, trimethylol propane, sorbitol, glycerine, alkylene glycols, poly(oxyalkylene) glycols, poly(oxyalkylene) derivatives of the preceding polyols, polyhydric derivatives of polymerizable vinyl monomers [e.g. poly-(vinyl alcohol)], and interpolymers of polymerizable aliphatic alcohols (e.g. copolymers of allyl alcohol). Suitable poly(oxyalkylene) glycols include those derived by the polymerization of ethylene oxide, 1,2-propylene oxide, 1,2-butylene oxide and interpolymers or block polymers of these epoxides. The molecular weights may be in the range of 200 up to 1,000,000 or higher.

The polyepoxides which may be used in the process of this invention should contain two or more epoxy groups and should have an epoxy equivalent weight (grams of resin per epoxy group) below 1,000, and preferably below 500. They may be saturated or unsaturated, aliphatic, cycloaliphatic, aromatic, or heterocyclic. Representative classes of polyepoxides are epoxidized triglycerides, the epoxy polyethers of polyhydric phenols, the glycidyl ethers of resins obtained by condensing an aldehyde with a polyhydric phenol, the reaction product of a polyhydric alcohol or phenol with a polyepoxide, polymers and copolymers of the epoxy-containing monomers possessing at least one polymerizable ethylenic linkage, epoxy esters of polybasic acids and the like. For typical specific examples see "Epoxy Resins, Their Applications and Technology," McGraw-Hill Book Company, Inc., New York, 1957, pp. 17–19.

The products of the invention can be applied by any of the accepted procedures used in coating films, fibers, fabrics and other shaped articles. This includes padding, dipping, brushing, spraying, roll transfer, spreading, etc. They can be applied either separately or simultaneously. Simultaneous application requires the use of a mutual solvent or an emulsion. It is also sometimes advantageous to add a small amount of a non-ionic detergent of the alkylphenoxypolyethylene glycol type to improve the hand of fibers and fabrics coated according to the process of the invention. Separate application of the additives is more convenient in certain applications. The polymeric polybasic acid is applied first from water or other polar solvent. The solvent is evaporated to give a uniform coating of the polymer. The polyepoxide is then applied from a suitable inert organic solvent and the solvent subsequently evaporated. An alternate procedure is to apply the polyepoxide both before and after application of the polymeric polybasic acid. This makes a stronger bond between the polymeric polybasic acid and the substrate. Reaction and cross-linking occur between the polyepoxide and polymeric polybasic acid on standing at room temperature but can be accelerated by heating. Catalysts which are effective in curing polyepoxides may also be incorporated in the coating solution of either or both polymeric additives.

A heating step is preferred to accelerate cross-linking, and is essential when the polyol cross-linker is used. After the water or other solvent is evaporated either with or without application of heat, the coating is then cured by heating at temperatures of 80–220° C. The curing temperature depends on various factors among which are the nature of the substrate, polyol or epoxide concentration, time of cure desired, and chemical composition of the polymeric polybasic acid and the polyol or polyepoxide.

The amount of the polymeric polybasic acid which should be applied to the substrate depends partially on the end use application. For instance, in coating fabrics, the hand of the fabric will be affected by the amount of polymeric additive applied. The minimum amount consistent with effective antistatic properties and hydrophilic surface characteristics is desirable. If the amount of coating were too large, stiffness of the coated fabric would detract from its use in wearing apparel, and the like. In other applications, such as treating hydrophobic fiber mats for paper products, larger amounts of additives would offer the advantage of increasing the stiffness of the treated product.

In general, the amount of polymeric polybasic acid applied to the substrate should be in the range of 0.1–2.0 weight percent but may be 0.05–5.0 weight percent based on the article being coated. The amount of polyol cross-linking agent should be preferably in the range of 0.04–25 percent by weight based on the polymeric polybasic acid, but may be within the range of 0.01–50. The polyepoxide which serves a dual roll of an adhesive and cross-linking agent is used to the extent of 10% to 100%, based on the weight of the polymeric polybasic acid. Larger amounts of polyepoxide may be useful (up to 200 weight percent based on the polymeric polybasic acid), when a primer coat is applied before application of the polymeric polybasic acid. The optimum amount required will depend on the specific nature of the reactants and substrates.

The optimum concentration of polyol depends on the time of cure desired and the chemical composition of polymeric polybasic acid and polyol. For instance, larger amounts of polyol can be used when the polymeric polybasic acid has been partially neutralized with an alkali metal ion. In any event, the conditions to be met are to cross-link the polymeric polybasic acid to the extent that it is no longer soluble but not so much that the acidic ions are masked and are not available to furnish ions for conducting static charges. These conditions can be determined for each combination within the ranges given above. In order to make this determination, films of polymeric polybasic acid containing various amounts of polyol can be cured using the desired conditions. The susceptibility of the film to water can then be ascertained, and the availability of the acidic groups can be checked by titrating with alkali. In general, 10–70% of the acidic groups should still be available. Variables such as time and temperature of cure and nature and concentration of reactants can be tailor-made to fit a wide variety of substances in various end-use applications. Polyesterification catalysts are not required, but may be added to speed up the cross-linking reaction between the polyol and the polymeric polybasic acid.

The concentration of additives in the coating solution is immaterial depending only upon the method of application such as whether part of the solution is removed by squeezing or scraping before evaporation of the solvent provided at least 0.1% polymeric polybasic acid is present. The polymeric polybasic acid may be used in the free form or it may be partially neutralized with a monovalent metal ion such as lithium, sodium, or potassium. However, at least 10% of the acid groups must be free in order to react with the polyol or the polyepoxide.

After curing, the coating consists of a partially cross-linked adherent, flexible polymeric material which functions very much as an ion exchange resin. The antistatic properties are improved by scouring or soaking in the presence of inorganic cations, such as sodium ion, which forms the sodium salt of the free acid form and which furnishes additional ions for conducting static electricity. After converting to the ionic form, the antistatic properties of these coatings are outstanding.

The following examples are intended to illustrate our invention but not to limit it in any way:

EXAMPLE 1

Polyacrylic acid was prepared by rolling the following mixture in a capped bottle at room temperature for 16 hours: 75 g. acrylic acid, 675 ml. water, 0.0375 g. ammonium persulfate and 0.0375 g. sodium metabisulfite. A 5% solution of the resulting polyacrylic acid had a viscosity of 4550 cps. (Brookfield LVF at 12 r.p.m., No. 3 spindle at 78° F.)

Approximate curing conditions, using as variables, polyol, concentration of polyol, temperature, and time were determined by titrating 0.15 g. samples of the polyacrylic acid with 0.1 N sodium hydroxide before and after curing. Fifteen ml. of a 1% solution containing the polyol cross-linking agent was evaporated to dryness and the film then heated to effect curing. The extent of cross-linking was determined by heating the film in 300 ml. of water for 2 hours and then titrating to a phenolphthalein end point with .1 N sodium hydroxide.

Typical results for pentaerythritol as curing agent are shown in Table 1: The column labeled, Percent Carboxyl Available for Titration, was obtained by determining the ratio of sodium hydroxide required to titrate the cured sample versus the original sample.

*Table 1*

| Percent Pentaerythritol Based on Polyacrylic Acid | Curing Temp., (° C.) | Curing Time, (min.) | Percent Carboxyl Available for Titration |
|---|---|---|---|
| 0.0 | 150 | 30 | 83 |
| 2.5 | 150 | 30 | 1.6 |
| 0.1 | 150 | 30 | 6.1 |
| 0.06 | 150 | 30 | 28 |
| 0.03 | 150 | 30 | 41 |
| 0.01 | 150 | 30 | 54 |
| 0.007 | 150 | 30 | 65 |
| 0.0 | 200 | 2.5 | 88 |
| 0.03 | 200 | 2.5 | 47 |
| 0.05 | 200 | 2.5 | 32 |
| 0.1 | 200 | 2.5 | 23 |
| 0.03 | 150 | 10 | 71 |
| 0.03 | 180 | 5 | 51 |
| 0.03 | 180 | 15 | 24 |
| 0.03 | 220 | 0.5 | 100 |
| 0.03 | 220 | 1.5 | 44 |
| 5.0 | 130 | 3 | 93 |
| 50.0 | 130 | 3 | 18 |

Similar results were obtained for other polyol crosslinking agents. Only slightly larger amounts of diols were required to get the same degree of cross-linking as with the tetrafunctional pentaerythritol. It can be seen from Table 1 that a wide variety of curing conditions can be obtained by adjusting the three variables, polyol concentration, curing temperature, and curing time. This is most valuable in adapting the process to cover different coating applications on a wide variety of products. For example, temperatures of 200° C. are used in processing certain synthetic fibers; whereas processing temperatures may be limited to 130° C. or lower for other fiber compositions. Another significant observation to be gathered from the data in Table 1 is the small amount of polyol required. For instance, only 0.03% pentaerythritol based on the polyacrylic acid caused over half of the acidic groups to become unavailable. This is only 1.6 mole percent pentaerythritol based on the polyacrylic acid.

An aqueous solution containing 0.25% of the previously referred to polyacrylic acid and 0.0075% pentaerythritol (0.03% based on the polyacrylic acid) was prepared. A swatch of Kodel (trademark of Eastman Kodak Company for poly-1,4-cyclohexanedimethylene terephthalate polyester fiber) fabric 2″ x 4″ was immersed in the solution and then passed through rollers to remove excess solution and give a wet pick-up of 100%. The fabric was dried in an oven at 100° C. The polymeric coating was then cured by heating the fabric at 150° C. for 30 minutes. Any unattached material was removed and the polyacrylic acid converted to the sodium salt by scouring the fabric for 30 minutes at 71° C. with stirring in an aqueous solution containing 0.5% sodium stearate and 0.2% sodium carbonate. The hand of the fabric was essentially unchanged.

The effectiveness of the hydrophilic coating can be determined in a very simple fashion by placing a small strip, ½″ x 2″, of the dry, treated fabric vertically over a water solution of a direct cotton dye or other colored solution, so that the bottom of the strip barely touches the surface of the solution. The rate at which the colored solution climbs up the strip of treated fabric compared with an untreated fabric gives a good indication of its hydrophilic character and wettability with water. Only those coatings which wet readily and rapidly show good anti-static properties. When the treated fabric of this experiment was tested, the dye solution wicked to the top of the strip in less than a minute. Several hours elapsed before the solution eventually wicked up the untreated Kodel fabric. The treated Kodel fabric still wicked rapidly after 35 more scourings (run as previously described). This shows that the polymeric coating is durable and will stand up under repeated washings.

A more exact determination of the antistatic properties of the treated fabric was carried out by measuring its electrical resistivity. This was accomplished by measuring the resistance of one square inch of fabric in a chamber controlled to 52% relative humidity using a Keithly Model 510 megohmmeter. Untreated Kodel fabric had a resistance of $2 \times 10^{13}$ ohms. Mercerized cotton had a resistance of $9 \times 10^{10}$ ohms. After four scourings, the treated fabric had a resistance of $2 \times 10^9$ ohms. After 12 scourings, the resistance was $7 \times 10^9$ ohms. Thus, the treated fabric has antistatic properties better than those of cotton which is known to be free from objectionable electrification.

The antisoiling property of the cross-linked acrylic acid coating was determined by washing a piece of the treated fabric in conjunction with a piece of cotton fabric which had been soiled by applying carbon black dispersed in a mixture of mineral oil, stearic acid, lanolin, and lard. Untreated Kodel fabric, when washed with cotton soiled in this manner, picked up dirt therefrom and came out of the wash solution colored gray to dark gray. However, the same Kodel fabric, when treated in accordance with this invention, did not pick up any color when washed three separate and consecutive times with fresh pieces of the soiled cotton fabric.

Identical results were obtained if the curing operation was carried out at 200° C. for 2½ minutes instead of 150° C. for 30 minutes. However, if the pentaerythritol were left out of the treating solution, and the treated fabric was heated at 150° C. for 30 minutes or 200° C. for 2½ minutes the antistatic properties were completely lost after 10 scourings. On the other hand, if too much pentaerythritol was present under a given set of curing conditions, say 5% pentaerythritol based on the polyacrylic acid, cured at 150° C. for 30 minutes, the antistatic properties after several scourings were only slightly better than those of untreated Kodel fabric. There is an optimum polyol concentration range for each set of curing conditions which will give good results. The easiest way to determine if one is outside that range is to run a curing test such as that described in Table 1. In general, the percent carboxyl available for titration should be greater than 10 but less than 70. In otherwords, polymeric polybasic acid should be cross-linked to the extent that it cannot be washed off but not so much that is loses its hydrophilic and ionic character.

EXAMPLE 2

A 0.5% solution in water of the polyacrylic acid described in Example 1 was made up.

A. The solution was 10% neutralized with sodium hydroxide and 0.04% pentaerythritol based on the acrylic acid polymer was added.

B. The solution was 10% neutralized with sodium hydroxide and 0.08% pentaerythritol based on the acrylic acid polymer was added.

C. The solution was 30% neutralized with sodium hydroxide and 0.04% pentaerythritol based on the acrylic acid polymer was added.

D. The solution was 30% neutralized with sodium hydroxide and 0.12% pentaerythritol based on the acrylic acid polymer was added.

E. The solution was 50% neutralized with sodium hydroxide and 0.04% pentaerythritol based on the acrylic acid polymer was added.

F. The solution was 50% neutralized with sodium hydroxide and 0.2% pentaerythritol based on the acrylic acid polymer was added.

Swatches of Kodel fabric were immersed in these solutions and pressed so that a coating of 0.5% acrylic acid polymer would remain after drying. The coating was cured by heating the treated fabric at 150° C. for 30 minutes. Resistances were determined on one square inch of the treated Kodel fabric after 3, 7 and 12 scourings. The methods described in Example 1 were used. The pieces of fabric were dried at 110° C. between each scouring. The results are shown in Table 2.

*Table 2*

| Treating Solution | Resistance in Ohms After— | | |
|---|---|---|---|
| | 3 Scourings | 7 Scourings | 12 Scourings |
| None | $2\times10^{13}$ | $2\times10^{13}$ | $2\times10^{13}$ |
| A | $2\times10^{9}$ | $1\times10^{8}$ | |
| B | $1\times10^{9}$ | $9\times10^{9}$ | $1\times10^{10}$ |
| C | $8\times10^{8}$ | $3\times10^{9}$ | $3\times10^{9}$ |
| D | $9\times10^{8}$ | $1\times10^{9}$ | $1\times10^{11}$ |
| E | $9\times10^{8}$ | $1\times10^{9}$ | $1\times10^{9}$ |
| F | $4\times10^{8}$ | $8\times10^{8}$ | $1\times10^{10}$ |

EXAMPLE 3

A 0.5% solution in water of the polyacrylic acid described in Example 1 was made up. The following polyols were added to the solution which was used to treat Kodel fabric as described in Example 2. The polyol percentage is based on the amount of acrylic acid polymer. In each case an amount of solution was used so that the dried, treated fabric contained 0.5% of the additive. The coating was cured by heating at 150° C. for 30 minutes. Resistances were determined as previously described. The results are shown in Table 3.

*Table 3*

| Polyol Cross-Linking Agent | Resistance in Ohms After— | | |
|---|---|---|---|
| | 4 Scourings | 8 Scourings | 12 Scourings |
| None | $9\times10^{10}$ | $5\times10^{12}$ | $2\times10^{13}$ |
| 0.04% Pentaerythritol | $1\times10^{10}$ | $2\times10^{9}$ | $2\times10^{9}$ |
| 0.08% Pentaerythritol | $1\times10^{9}$ | $8\times10^{9}$ | $9\times10^{9}$ |
| 0.08% Carbowax 400 [1] | $2\times10^{8}$ | $3\times10^{9}$ | $1\times10^{9}$ |
| 2.0% Carbowax 400 | $8\times10^{8}$ | $6\times10^{9}$ | $2\times10^{9}$ |
| 0.08% Sorbitol | $4\times10^{9}$ | $7\times10^{9}$ | $9\times10^{9}$ |
| 0.08% Sorbitol polyoxypropylene glycol | $1\times10^{9}$ | $2\times10^{9}$ | $3\times10^{9}$ |
| 2.0% Sorbitol polyoxypropylene glycol | $1\times10^{9}$ | $1\times10^{9}$ | $2\times10^{9}$ |
| 0.1% Poly(vinyl alcohol) | $7\times10^{9}$ | $5\times10^{9}$ | $1\times10^{10}$ |
| 0.04% Dipentaerythritol | $4\times10^{9}$ | $7\times10^{9}$ | $5\times10^{9}$ |

[1] Trademark of Union Carbide Chemical Company for polyoxyethylene glycol of 400 molecular weight.

EXAMPLE 4

An aqueous solution was made up containing 1.0% of the polyacrylic acid described in Example 1 and 0.04% pentaerythritol based on the polyacrylic acid. This solution was padded on a strip of spun staple Kodel fabric 1 ft. by 3 ft. in size and excess solution was squeezed out between rollers. The dried fabric had a pick-up of 0.37% polyacrylic acid. Continuous filament Kodel fabric was also treated with the same solution to give a pick-up of 0.33% polyacrylic acid. Both fabrics were heated for 30 minutes at 150° C. to effect curing of the coating. Samples of each fabric were washed 1 through 11 times using AATCC No. 3 Wash Test, and dried between each cycle at 121° C. in a forced air oven. The resistance of one square inch was determined after 1, 3, 5, 7, 9 and 11 wash cycles by the method described in Example 1. The tests were conducted at 55% relative humidity rather than 52%. The results are shown in Table 4.

*Table 4*

| Fabric | Resistance in Ohms After Wash Cycles | | | | | |
|---|---|---|---|---|---|---|
| | 1 | 3 | 5 | 7 | 9 | 11 |
| Spun Staple | $6\times10^{8}$ | $1\times10^{9}$ | $1\times10^{9}$ | $4\times10^{9}$ | $6\times10^{9}$ | $6\times10^{9}$ |
| Continuous Filament | $6\times10^{8}$ | $1\times10^{10}$ | $1\times10^{10}$ | $3\times10^{10}$ | $2\times10^{10}$ | $5\times10^{10}$ |

The durability of the coating to dry cleaning was also determined. There was no appreciable change in the antistatic properties after 10 dry cleaning cycles. A sample of the treated fabric was dyed with a disperse dye. Dyeing was satisfactory and the antistatic properties were not affected by the dye or dyeing procedure. The light fastness of the dyed fabric was just as good as that of a dyed, untreated Kodel fabric.

EXAMPLE 5

The antistatic coating composition used in Example 4 was also applied to continuous filament Kodel yarn. The solution was applied by means of a lubricant transfer roll to the fibers as they came out of the drafting chamber. The coating was subsequently cured by heating the fibers at 220° C. for 1½ minutes. The lubricant roll speed was adjusted so that a pick-up of 0.4% polyacrylic acid was obtained. A sock was knitted from the fibers and was found to have good antistatic properties even after repeated washings.

EXAMPLE 6

An aqueous solution containing 0.5% of the polyacrylic acid described in Example 1 was 50% neutralized with sodium hydroxide and 0.04% dipentaerythritol based on the acrylic acid polymer was added. This solution was applied to continuous filament tow prior to crimping, heat stabilizing, and cutting to give cut-staple yarn with a 0.2% add-on. The coating was cured during this operation by heating at 200° C. for 2 to 2½ minutes. In further processing of this yarn, such as carding and spinning, there was no static problem. Fabric woven from the spun yarn had a durable antistatic finish.

EXAMPLE 7

A coating composition of 0.25% polyacrylic acid and 0.04% pentaerythritol based on the polyacrylic acid was applied to swatches of the following fabrics:

A. Dacron (trademark of E. I. du Pont for polyethylene terephthalate fiber).
B. Orlon 42 (trademark of E. I. du Pont for polyacrylonitrile fiber).
C. Nylon.
D. Kodel (trademark of Eastman Kodak Company for poly-1,4-cyclohexanedimethylene terephthalate fiber).
E. Polypropylene.
F. Verel (trademark of Eastman Kodak Company for modacrylic fiber). As used herein and in the appended claims, modacrylic fiber refers to a manufactured fiber in which the fiber-forming substance is any long chain synthetic polymer composed of at least 35% and less than 85% by weight of acrylonitrile units.
G. Cellulose acetate.
H. Mercerized cotton.
I. Spun viscose rayon.

Excess solution was squeezed out to give a wet pick-up of 100%. Fabrics A, B, C and D were heated at 150° C. for 30 minutes. Fabrics E, F, G, H and I were heated at 130° C. for 30 minutes. Durability of the cured polyacrylic acid coating was determined by running each fabric through 12 washing cycles. Each washing cycle consists in stirring the treated fabric at 71° C. for 30 minutes in an aqueous solution containing 0.5% sodium stearate and 0.2% sodium carbonate, rinsing, and drying.

After 12 washings all fabrics except C and E wet readily when one end was placed in a colored dye solution as described in Example 1. Fabrics C and E wet fairly readily and still much faster than the untreated material. It should be pointed out that fabrics B, G, H and I wet readily without treatment. The resistance of the untreated fabric and the treated fabric after 12 washings was determined as described in Example 1. These resistances were run in a chamber controlled to relative humidities of 11, 29, 53, 78 and 90% to determine the effect of relative humidity on the potential antistatic properties. The results are shown in Table 5.

*Table 5*

| Fabric | Resistance in Ohms at Relative Humidity | | | | |
|---|---|---|---|---|---|
| | 11% | 29% | 53% | 78% | 90% |
| A (untreated) | $1 \times 10^{13}$ | $1 \times 10^{13}$ | $1 \times 10^{13}$ | $3 \times 10^{12}$ | $5 \times 10^{11}$ |
| A (treated) | $2 \times 10^{12}$ | $4 \times 10^{11}$ | $8 \times 10^{9}$ | $6 \times 10^{7}$ | $1 \times 10^{7}$ |
| B (untreated) | $2 \times 10^{13}$ | $2 \times 10^{13}$ | $2 \times 10^{13}$ | $9 \times 10^{12}$ | $9 \times 10^{12}$ |
| B (treated) | $1 \times 10^{13}$ | $7 \times 10^{12}$ | $3 \times 10^{10}$ | $1 \times 10^{8}$ | $2 \times 10^{7}$ |
| C (untreated) | $2 \times 10^{13}$ | $7 \times 10^{12}$ | $2 \times 10^{12}$ | $2 \times 10^{10}$ | $9 \times 10^{8}$ |
| C (treated) | $8 \times 10^{11}$ | $1 \times 10^{11}$ | $4 \times 10^{9}$ | $1 \times 10^{7}$ | $<10^{7}$ |
| D (untreated) | $2 \times 10^{13}$ | $2 \times 10^{13}$ | $2 \times 10^{13}$ | $1 \times 10^{13}$ | $1 \times 10^{13}$ |
| D (treated) | $9 \times 10^{11}$ | $1 \times 10^{11}$ | $2 \times 10^{9}$ | $1 \times 10^{7}$ | $<10^{7}$ |
| D (treated)* | $2 \times 10^{12}$ | $4 \times 10^{11}$ | $1 \times 10^{10}$ | $4 \times 10^{7}$ | $1 \times 10^{7}$ |
| E (untreated) | $2 \times 10^{13}$ | $2 \times 10^{13}$ | $2 \times 10^{13}$ | $1 \times 10^{13}$ | $1 \times 10^{13}$ |
| E (treated) | $8 \times 10^{11}$ | $1 \times 10^{11}$ | $4 \times 10^{9}$ | $2 \times 10^{7}$ | $<10^{7}$ |
| F (untreated) | $2 \times 10^{13}$ | $2 \times 10^{13}$ | $2 \times 10^{13}$ | $1 \times 10^{13}$ | $2 \times 10^{12}$ |
| F (treated) | $7 \times 10^{11}$ | $1 \times 10^{11}$ | $4 \times 10^{9}$ | $1 \times 10^{7}$ | $<10^{7}$ |
| G (untreated) | $2 \times 10^{13}$ | $2 \times 10^{13}$ | $2 \times 10^{13}$ | $1 \times 10^{13}$ | $4 \times 10^{10}$ |
| G (treated) | $1 \times 10^{12}$ | $2 \times 10^{11}$ | $4 \times 10^{9}$ | $4 \times 10^{7}$ | $1 \times 10^{7}$ |
| H (untreated) | $9 \times 10^{12}$ | $2 \times 10^{12}$ | $9 \times 10^{10}$ | $1 \times 10^{9}$ | $2 \times 10^{8}$ |
| H (treated) | $2 \times 10^{12}$ | $2 \times 10^{11}$ | $8 \times 10^{9}$ | $8 \times 10^{7}$ | $2 \times 10^{7}$ |
| I (untreated) | $7 \times 10^{12}$ | $8 \times 10^{11}$ | $5 \times 10^{10}$ | $9 \times 10^{8}$ | $9 \times 10^{7}$ |
| I (treated) | $2 \times 10^{11}$ | $2 \times 10^{10}$ | $1 \times 10^{9}$ | $1 \times 10^{7}$ | $<10^{7}$ |

*37 washings.

It can be seen from Table 5 that all the treated fabrics have resistances in the same range as untreated cotton at the 53% relative humidity level. In ordinary apparel use, cotton is known to be free from objectionable electrification. Furthermore, treated Dacron, nylon, Kodel, polypropylene, Verel and cellulose acetate are as good at 29% relative humidity as cotton is at 53% relative humidity. The low resistance is even carried down to 11% relative humidity for many of the treated fabrics. This degree of protection is very valuable in treating either hydrophobic or hydrophilic fibers or fabrics used in the manufacture of work clothes for the chemical industry and hospitals where static discharges cannot be tolerated.

EXAMPLE 8

Dacron and polypropylene fabrics were impregnated with 0.25% polyacrylic acid and 25% pentaerythritol, based on the polyacrylic acid, by immersing the fabrics in an aqueous soltuion of the additives. The fabrics were heated in a forced air oven at 130° C. for 6 minutes. About 4 of the 6 minutes were required to evaporate the water. The remaining 2 minutes were sufficient to cure the coating with this relatively large amount of polyol cross-linking agent. After 12 washings, the resistances of the Dacron and polypropylene fabrics were respectively $6 \times 10^{11}$ and $2 \times 10^{10}$ ohms.

EXAMPLE 9

A polyacrylic acid solution 50% neutralized with sodium hydroxide and containing 50% pentaerythritol, based on the acrylic acid polymer, was sprayed onto a flame treated polyethylene film. The solids add-on was 0.15%. The film was heated at 100° C. for 30 minutes. The usual static problem of clinging, characteristic of hydrophobic thin films, was eliminated by the above treatment.

EXAMPLE 10

Mylar (trademark of E. I. du Pont for polyethylene terephthalate film) was sprayed with a 50% neutralized solution of polyacrylic acid containing 25% pentaerythritol, based on the acrylic acid polymer. The solids add-on was 0.2%. This coated film was heated at 130° C. for 10 minutes. A durable antistatic coating was obtained which was resistant to removal by water.

EXAMPLE 11

In the preceding examples, a high viscosity polyacrylic acid was used. Substitution with a relatively low viscosity polyacrylic acid, 52 cps. for a 5% solution (Brookfield LVF at 12 r.p.m., No. 2 spindle at 78° F.), gave inferior results. An antistatic coating is obtained but the durability of the coating on repeated washing is definitely inferior. For instance, after 10 washings, the resistance of a Kodel fabric impregnated with 0.5% of the lower viscosity polyacrylic acid, cross-linked with 0.03% pentaerythritol, was $4 \times 10^{12}$ ohms. This degree of protection would be suitable in certain applications not involving repeated washing. Without the addition of the polyol, the antisatic properties were completely lost after 3 washings. Obviously, the degree of durability increases with higher viscosity polyacrylic acid. However, it was found that polyacrylic acid higher in viscosity than that used in Examples 1–10 was of no added benefit.

EXAMPLE 12

A styrene-maleic anhydride copolymer was 40% neutralized with potassium hydroxide. An aqueous solution containing 0.03% pentaerythritol, based on the acrylic polymer, was used to impregnate Dacron fabric with 0.4% of the additive combination. The coating was cured by heating the fabric at 200° C. for 3 minutes. The resistance of one square inch of the treated fabric after 12 washings was $6 \times 10^{10}$ ohms.

EXAMPLE 13

A copolymer of 75 acrylic acid-25 lithium salt of N-(p-sulfophenyl)maleamic acid, and 0.03% pentaerythritol, based on the acrylic copolymer, was coated from an aqueous solution onto Kodel fabric to give a 0.25% pickup. The coated fabric was heated at 150° C. for 30 minutes to effect the desired degree of cross-linking. The resistance of one square inch of treated fabric was $8 \times 10^{10}$ ohms after 12 washings.

EXAMPLE 14

A copolymer having the composition, 75 acrylic-25 sodium allyl sulfonate, was combined with pentaerythritol, coated, and cured on Kodel fabric as described in Example 13. The resistance of one square inch of treated fabric was $1 \times 10^{10}$ ohms after 12 washings.

EXAMPLE 15

A copolymer having the composition, 95 acrylic acid-5 allyl alcohol, was combined with pentaerythritol, coated, and cured on Kodel fabric as described in Example 13. The resistance of one square inch of treated fabric was $7 \times 10^{10}$ ohms after 4 washings.

EXAMPLE 16

Listed in Table 6 are other representative examples of the many possible combinations of polymeric polybasic acid and polyol cross-linking agent coated on various fabric substrates. The coating additives were applied from water and cured by heating either at 130° C. for 30 minutes or at 150° C. for 30 minutes. The electrical resistance at 52% relative humidity was determined on one square inch of fabric after 12 washings. The method of washing was described in Example 1.

Table 6

| Polymeric Polybasic Acid | | Polyol Cross-linking Agent | | Fabric [1] | Resistance (ohms) | |
| --- | --- | --- | --- | --- | --- | --- |
| Composition | Add-On (percent) | Composition | Percent Based on Acrylic Polymer | | Untreated Fabric | Treated Fabric |
| Polymethacrylic acid | 0.4 | Trimethylol propane | 0.06 | Kodel | $2\times10^{13}$ | $7\times10^9$ |
| 90 acrylic acid-10 lauryl acrylate copolymer | 0.5 | Glycerine | 0.08 | Dacron | $1\times10^{13}$ | $1\times10^{10}$ |
| Sulfonated styrene-maleic anhydride copolymer.[2] | 0.3 | Dipentaerythritol | 0.06 | Nylon | $2\times10^{12}$ | $3\times10^9$ |
| 60 vinylbenzenesulfonic acid - 40 acrylic acid copolymer | 0.25 | Ethylene glycol | 0.1 | Polycaprolactam | $4\times10^{12}$ | $8\times10^8$ |
| Phosphoric acid ester of (54 glycidyl allyl ether-46 sodium acrylate copolymer) | 0.5 | Sorbitol | 0.2 | Arnel | $1\times10^{13}$ | $5\times10^9$ |
| 50 acrylic acid-50 methacrylic acid copolymer | 0.5 | Diethylene glycol | 0.08 | Glass | $2\times10^{13}$ | $2\times10^{10}$ |
| 85 acrylic acid-15 N-isopropylacrylamide copolymer | 0.4 | Pentaerythritol | 0.03 | Silk | $8\times10^{12}$ | $4\times10^9$ |

[1] Kodel and Dacron are fiber trademarks as previously defined. Arnel is a trademark of Celanese Corporation of America for cellulose triacetate fiber.
[2] Averaging one sulfonic acid group per benzene ring.

EXAMPLE 17

A 0.25% solution of polyacrylic acid in water was prepared from a polymer having a viscosity of 15,000 cps. at a concentration of 15% solids (Brookfield LVF at 12 r.p.m., No. 2 spindle 78° F.). A swatch of Kodel (trademark of Eastman Kodak Company for poly-1,4-cyclohexanedimethylene terephthalate polyester fiber) fabric 2" x 4" was immersed in the polyacrylic acid solution and then passed through rollers to remove excess solution and give a wet pick-up of 100%. The fabric was dried in an oven at 100° C. The coated fabric was then immersed in an acetone solution containing 0.3% epon resin D.E.R. 331 (commercially available polyepoxide based on Bisphenol A and produced by Dow Chemical Co.). Excess solution was pressed out of the fabric to give a dry pickup of 0.3% epon resin. The acetone was allowed to evaporate and the fabric was heated at 130° C. for 30 minutes. The sodium salt of the polyacrylic acid reaction product was formed and any unreacted material was taken off by scouring. The scouring operation was carried out by heating the coated fabric for 30 minutes at 71° C. with stirring in an aqueous solution consisting of 0.5% sodium stearate and 0.2% sodium carbonate.

The effectiveness of the hydrophilic coating can be determined in a very simple fashion by placing a small strip, ½" x 2" of the dry treated fabric vertically over a water solution of a direct cotton dye, or other colored solution, so that the bottom of the strip barely touches the surface of the solution. The rate at which the colored solution climbs up the strip of treated fabric compared with an untreated fabric gives a good indication of its hydrophilic character and wettability with water. Only those coatings which wet readily and rapidly show good antistatic properties. When the treated fabric of this experiment was tested, the dye solution wicked to the top of the strip in less than two minutes. Several hours elapsed before the solution eventually wicked up the untreated Kodel fabric. The durability of the coating to washing was found to be very good. The treated fabric still wet readily after 10 washings, as previously described, with soap solution.

A more exact determination of the antistatic properties of the treated fabric was carried out by measuring its electrical resistivity. This was accomplished by measuring the resistance of one square inch of fabric in a chamber controlled to 52% relative humidity using a Keithly Model 510 megohmmeter. Untreated Kodel fabric had a resistance of $2\times10^{13}$ ohms. Mercerized cotton had a resistance of $9\times10^{10}$ ohms. The treated fabric had a resistance of $1.5\times10^9$ ohms after 6 washings and $1\times10^9$ ohms after 12 washings. Thus the treated fabric has antistatic properties as good as those of cotton which is known to be free from objectionable electrification in normal use.

EXAMPLE 18

An aqueous emulsion was prepared by homogenizing in a home blender a mixture containing 0.25% of polyacrylic acid 60% neutralized with potassium hydroxide, 1% Igepal CO–630 [a nonionic synthetic detergent having the general structure, alkylphenoxypoly(oxyethylene glycol)] and 0.1% of Epon X–701 [an aliphatic polyepoxide type, poly(allylglycidyl ether), manufactured by Shell Chemical Corporation]. Kodel fabric was immersed in the emulsion and squeezed to a wet pick-up of 100%. The fabric was then dried at 110° C. and cured by heating at 140° C. for 30 minutes. The resistance of the fabric after 10 washings was $5\times10^{10}$ ohms. The nonionic detergent serves the dual purpose of emulsifying the polyepoxide and improving the hand of the treated fabric. Fabrics coated from solution tend to be slightly stiff before they have been scoured one or two times.

EXAMPLE 19

A solution containing 0.25% polyacrylic acid and 0.25% polyepoxide D.E.R. 331 (for source see Example 17) was prepared in 2:1 dioxane-water. The solution was hazy but did not separate on standing. Kodel fabric was impregnated with this solution so that the dry, treated fabric also contained 0.25% of each of the additives. The coating was cured by heating at 200° C. for 5 minutes. The electrical resistance of the treated fabric was determined after 3, 7 and 12 washings in soap solution. These values were $2\times10^9$, $9\times10^8$ and $2\times10^{10}$ ohms, respectively. The antistatic coating holds up equally well on repeated dry cleaning. The nature of the substrate is immaterial and the antistatic coating is just as durable and effective when applied to other fibers and fabrics. This antistatic coating can also be applied to film or other shaped articles by brushing or spraying to eliminate static problems.

EXAMPLE 20

Listed in the following table are representative examples of the many possible combinations of polymeric polybasic acid and polyepoxide coated on various fabric substrates. The electrical resistance at 52% relative humidity of one square inch of fabric after 10 washings, as described in Example 1, is also given for the treated and untreated material. The coating was applied from dioxane or dioxane-water mixture and was cured by heating at 130° C. for 30 minutes.

Table 7

| Polymeric Polybasic Acid | | Polyepoxide | | Fabric [2] | Resistance (ohms) | |
|---|---|---|---|---|---|---|
| Composition | Add-On, percent | Composition [1] | Add-On, percent | | Untreated Fabric | Treated Fabric |
| Styrene-maleic anhydride copolymer | 0.6 | A | 0.3 | Dacron | $1 \times 10^{13}$ | $2 \times 10^{10}$ |
| Polymethacrylic acid | 0.4 | B | 0.2 | Orlon | $2 \times 10^{13}$ | $8 \times 10^{9}$ |
| 80 acrylic acid-20 lauryl acrylate copolymer | 0.3 | A | 0.25 | Cellulose acetate | $2 \times 10^{13}$ | $9 \times 10^{9}$ |
| Sulfonated styrene-maleic anhydride copolymer [3] | 0.25 | C | 0.5 | Nylon | $2 \times 10^{12}$ | $3 \times 10^{9}$ |
| 60 vinyl benzene sulfonic acid-40 acrylic acid copolymer | 0.2 | D | 0.25 | Verel | $2 \times 10^{13}$ | $5 \times 10^{9}$ |
| Phosphoric acid ester of (54 glycidyl allyl ether-46 sodium acrylate) | 0.8 | B | 0.3 | Kodel | $2 \times 10^{13}$ | $1 \times 10^{10}$ |
| 90 acrylic acid-10 allylsulfoacetate copolymer | 0.25 | C | 0.35 | Polypropylene | $2 \times 10^{13}$ | $4 \times 10^{10}$ |
| 85 acrylic acid-15 lithium salt of N-(p-sulfophenyl) maleamic acid copolymer | 0.3 | D | 0.25 | Arnel | $2 \times 10^{13}$ | $9 \times 10^{9}$ |

[1] Composition A is the Bisphenol A-epichlorohydrin epoxy resin D.E.R. 331 supplied by Dow Chemical Company. Composition B is the aliphatic polyepoxide type, poly(allyl glycidyl ether) Epon X-701, supplied by Shell Chemical Corporation. Composition C is a straight chain aliphatic epoxy resin, Oxiron 2000, supplied by Food Machinery and Chemical Corporation. Composition D is an epoxidized novolac resin, D.E.N. 438, supplied by Dow Chemical Company.

[2] Dacron is a trademark of E. I. du Pont for polyethylene terephthalate polyester fiber. Orlon is a trademark of E. I. du Pont for poly(acrylonitrile) acrylic fiber. Kodel is a trademark of Eastman Kodak Company for poly(1,4-cyclohexanedimethylene terephthalate) polyester fiber. Verel is a trademark of Eastman Kodak Company modacrylic fiber. Arnel is a trademark of Celanese Chemical Corporation for cellulose triacetate fiber.

[3] Averaging one sulfonic group per benzene ring.

EXAMPLE 21

A copolymer having the composition, 95 acrylic acid–5 laurylmethacrylate, together with 25% pentaerythritol (based on the weight of acrylic acid copolymer) was coated on Kodel fabric from a 1% aqueous solution to give a 0.5% pick-up of copolymer. The fabric was heated at 150° C. for 7 minutes to effect curing of the polymeric coating. The electrical resistance of one square inch of treated fabric was $3 \times 10^9$ ohms after 10 washings. The resistance of the treated fabric to soiling when laundered with dirty, oily cloth was excellent. This resistance to soiling is characteristic of all the compositions described in this invention.

EXAMPLE 22

An aqueous solution was prepared containing 1% (95 acrylic acid-5 laurylmethacrylate) copolymer, 0.5% Polyox WSR 301 (high molecular weight polyoxethylene glycol supplied by Carbide and Carbon Chemical Corp.), and 0.1% pentaerythritol. Kodel fabric was wetted with this solution and then squeezed between rollers to a wet pick-up of 50%. The fabric was dried and then heated at 150° C. for 10 minutes. The polyoxyethylene glycol serves two functions. It wets the polyester more effectively and thus leads to a more adherent polymeric coating. It also reacts with the acrylic acid groups to aid in insolubilizing the coating by crosslinking. The treated fabric was washed 10 times after which the electrical resistance was $6 \times 10^9$ ohms. The treated fabric had excellent resistance to soiling when laundered with dirty, oily cloth.

EXAMPLE 23

A copolymer consisting of 80% acrylic acid and 20% 2-ethylhexylacrylate was dissolved in a mixture of equal parts acetone and water to give a 0.5% solution. Polyglycol P2000 (polyoxypropylene glycol supplied by Dow Chemical Co.) and epoxy resin D.E.R. 331 were added to the solution to give concentrations of 0.3% and 0.2% respectively. Kodel fabric was immersed in the solution and squeezed to a wet pick-up of 100%. The acetone was allowed to evaporate and the treated fabric was heated at 150° C. for 30 minutes. A durable antistatic and antisoiling coating was obtained. This coating was equally effective on other synthetic textile materials.

EXAMPLE 24

A 1% solution of sodium carboxymethylcellulose, having a viscosity of 1000 cps. at 20° C., was neutralized to a pH of 2.5 with hydrochloric acid. Dipentaerythritol equivalent to 10% of the carboxymethylcellulose present in the solution was added. Dacron and Kodel fabrics were immersed in the solution and squeezed between rollers to a wet pick-up of 50%. The impregnated fabrics were then heated at 150° C. for 15 minutes. After 10 washings, as described in Example 1, the electrical resistances of one square inch of the fabrics were $7 \times 10^9$ and $2 \times 10^{10}$ ohms, respectively. A durable antistatic finish was also obtained when 50% of the diglycidyl ether of glycerine (based on the carboxymethylcellulose) was substituted for the dipentaerythritol in the preceding solution.

Any natural or synthetic polymeric material which tends to accumulate a static charge at low or in some instances, high relative humidity; or is so hydrophobic that it is not readily wet by water can be treated according to the process of this invention to accomplish the desired effect. This includes the linear, crystalline polyesters such as polyethylene terephthalate and poly(cyclohexanedimethylene terephthalate); polyamides such as nylon 6 and nylon 66; poly(acrylonitrile); poly(vinyl chloride); vinylidene chloride copolymers; other poly(acrylics); cellulose acetate; cellulose triacetate; nitrocellulose; viscose rayon; cotton; wool; polyolefins such as polyethylene and polypropylene; linear, crystalline polyurethanes; and inorganic polymers such as glass.

The coatings as described hereinabove have good utility under ordinary conditions, and these treatments impart to fabrics finishes which are ordinarily permanent under reasonable or normal conditions. However, under extreme conditions the finish might be abraded off, for example where machine scouring and tumble-type drying is employed. A more firmly bonded coating might therefore be desirable. This specially bonded finish can be obtained by employing a very low concentration (0.001–0.05%) of a wetting agent in admixture with the coating composition. Nonionic, anionic, and even cationic wetting agents, at this low concentration, can be used with equal effectiveness. Fluorochemical surfactants appear to be especially advantageous in promoting greater adherence of the polymeric coating to the substrate. While we do not desire to be bound by any theory concerning the mechanism of adhesion, the increased adhesion obtained with the addition of low concentrations of wetting agents is probably associated with a closer approach on a molecular scale of the polymeric coating to the substrate.

The invention has been described in detail with particular reference to preferred embodiments thereof, but it will be understood that variations and modifications can be effected within the spirit and scope of the invention as described hereinabove and as defined in the appended claims.

We claim:
1. A treatment for imparting antistatic and soil resistant properties to the surface of articles comprising a resin selected from the group consisting of natural and synthetic resins which comprises applying to the surface of such an article an inert solvent containing as an essential ingredient a polymeric polybasic acid containing at least one acid group selected from the class consisting of —COOH, —$SO_3H$ and —$PO_4H_2$, at least 10% of the acid being carboxyl, having a ratio of carbon atoms to acidic groups in the repeat unit in the range of 2:1 to 20:1 and having a molecular weight of 500–750,000, said liquid composition also containing a crosslinking agent selected from the class consisting of polyols and polyepoxides, and heating it to a temperature within the range from around 80° C. to around 220° C. to partially crosslink said polymeric polybasic acid so that after crosslinking, from 10 to 70% of the acid groups of the polymeric polybasic acid are free acid groups.

2. A treatment for imparting antistatic and soil resistant properties to the surface of articles comprising a resin selected from the group consisting of natural and synthetic resins which comprises applying to the surface of such an article an inert solvent composition containing as an essential ingredient 0.1–2.0 weight percent based on the article of a polymeric polybasic acid containing at least one acid group selected from the class consisting of —COOH, —$SO_3H$ and —$PO_4H_2$, at least 10% of the acid being carboxyl, having a ratio of carbon atoms to acidic groups in the repeat unit in the range of 2:1 to 20:1 and having a molecular weight of 500–750,000, said liquid composition also containing 0.01–200% by weight based on the polymeric acid of a crosslinking agent selected from the class consisting of polyols and polyepoxides and heating it to a temperature within the range from around 80° C. to around 220° C. to partially crosslink said polymeric polybasic acid so that after crosslinking, from 10 to 70% of the acid groups of the polymeric polybasic acid are free acid groups.

3. A treatment for imparting antistatic and soil resistant properties to the surface of articles comprising a resin selected from the group consisting of natural and synthetic resins which comprises applying to the surface of such an article an inert solvent containing as an essential ingredient a polymeric polybasic acid containing at least one acid group selected from the class consisting of —COOH, —$SO_3H$ and —$PO_4H_2$, at least 10% of the acid being carboxyl, having a ratio of carbon atoms to acidic groups in the repeat unit in the range of 2:1 to 20:1 and having a molecular weight of 500–750,000, said liquid composition also containing a polyol crosslinking agent and heating it to a temperature within the range from around 80° C. to around 200° C. to partially crosslink said polymeric polybasic acid so that after crosslinking, from 10 to 70% of the acid groups of the polymeric polybasic acid are free acid groups.

4. A treatment for imparting antistatic and soil resistant properties to the surface of articles comprising a resin selected from the group consisting of natural and synthetic resins which comprises applying to the surface of such an article an inert solvent composition containing as an essential ingredient 0.1–2.0 weight percent based on the article of a polymeric polybasic acid containing at least one acid group selected from the class consisting of —COOH, —$SO_3H$ and —$PO_4H_2$, at least 10% of the acid being carboxyl, having a ratio of carbon atoms to acidic groups in the repeat unit in the range of 2:1 to 20:1 and having a molecular weight of 500–750,000, said liquid composition also containing 0.01–50.0% by weight based on the polymeric acid of a polyol crosslinking agent and heating it to a temperature within the range from around 80° C. to around 200° C. to partially crosslink said polymeric polybasic acid so that after crosslinking, from 10 to 70% of the acid groups of the polymeric polybasic acid are free acid groups.

5. A treatment for imparting antistatic and soil resistant properties to the surface of articles comprising a resin selected from the group consisting of natural and synthetic resins which comprises applying to the surface of such an article an inert solvent containing as an essential ingredient a polymeric polybasic acid containing at least one acid group selected from the class consisting of —COOH, —$SO_3H$ and —$PO_4H_2$, at least 10% of the acid being carboxyl, having a ratio of carbon atoms to acidic groups in the repeat unit in the range of 2:1 to 20:1 and having a molecular weight of 500–750,000, said liquid composition also containing a polyepoxide crosslinking agent and heating it to a temperature within the range from around 80° C. to around 220° C. to partially crosslink said polymeric polybasic acid so that after crosslinking, from 10 to 70% of the acid groups of the polymeric polybasic acid are free acid groups.

6. A treatment for imparting antistatic and soil resistant properties to the surface of articles comprising a resin selected from the group consisting of natural and synthetic resins which comprises applying to the surface of such an article an inert solvent composition containing as an essential ingredient 0.1–2.0 weight percent based on the article of a polymeric polybasic acid containing at least one acid group selected from the class consisting of —COOH, —$SO_3H$ and —$PO_4H_2$, at least 10% of the acid being carboxyl, having a ratio of carbon atoms to acidic groups in the repeat unit in the range of 2:1 to 20:1 and having a molecular weight of 500–750,000, said liquid composition also containing 10–200% by weight based on the polymeric acid of a polyepoxide crosslinking agent and heating it to a temperature within the range from around 80° C. to around 220° C. to partially crosslink said polymeric polybasic acid so that after crosslinking, from 10 to 70% of the acid groups of the polymeric polybasic acid are free acid groups.

7. A treatment for imparting antistatic and soil resistant properties to the surface of articles comprising a resin selected from the group consisting of natural and synthetic resins which comprises applying to the surface of such an article an inert solvent containing as an essential ingredient a polymeric polybasic acid containing at least one acid group selected from the class consisting of —COOH, —$SO_3H$ and —$PO_4H_2$, at least 10% of the acid being carboxyl, having a ratio of carbon atoms to acidic groups in the repeat unit in the range of 2:1 to 20:1 and having a molecular weight of 200,000–750,000, said liquid composition also containing a crosslinking agent selected from the class consisting of polyols and polyepoxides, and heating it to a temperature within the range of from around 80° C. to around 220° C. to partially crosslink said polymeric polybasic acid so that after crosslinking, from 10 to 70% of the acid groups of the polymeric polybasic acid are free acid groups.

8. A polyester fiber having an antistatic, soil resistant coating thereon comprising a polymeric polybasic acid which is a copolymer of $CH_2=CR—CO_2H$ and $CH_2=CRCO_2R'$ containing at least 90% $CH_2=CRCO_2H$, wherein R is selected from the group consisting of hydrogen and methyl and R' is an alkyl group having 1 to 18 carbon atoms, partially crosslinked with a polyol so that from 10 to 70% of the acid groups in the crosslinked polymeric polybasic acid are free acid groups.

9. A polyester fiber according to claim 8 wherein the polyester is poly-1,4-cyclohexanedimethylene terephthalate and the polyol is pentaerythritol.

10. A polyester fiber according to claim 8 wherein the polyester is poly(ethylene terephthalate) and the polyol is dipentaerythritol.

11. A cellulose acetate fiber having an antistatic, soil resistant coating thereon comprising a polymeric polybasic acid selected from the group consisting of polyacrylic acid and polymethacrylic acid partially crosslinked with poly(vinyl alcohol) so that from 10 to 70% of the acid groups in the crosslinked polymeric polybasic acid are free acid groups.

12. A polypropylene fiber having an antistatic, soil resistant coating thereon comprising a polymeric polybasic acid which is a copolymer of $CH_2=CR-CO_2H$ and $CH_2=CR-CONR'R''$ containing at least 50%

$$CH_2=CR-CO_2H$$

wherein R is selected from the group consisting of hydrogen and methyl and R' and R'' are selected from the group consisting of hydrogen and alkyl groups having 1 to 4 carbon atoms, crosslinked with a polyepoxide which is the reaction product of 2,2-bis(p-hydroxyphenol)propane and epichlorohydrin having an epoxy equivalent weight of 170–500, said crosslinking being partial so that from 10 to 70% of the acid groups in the crosslinked polymeric polybasic acid are free acid groups.

13. A modacrylic fiber having an antistatic, soil resistant coating thereon comprising a hydrolyzed styrene-maleic anhydride copolymer crosslinked with a polyepoxide which is the reaction product of glycerin and epichlorohydrin having an epoxy equivalent weight of 150 to 500, said crosslinking being partial so that from 10 to 70% of the acid groups in the crosslinked copolymer are free acid groups.

14. A polyamide fiber having an antistatic, soil resistant coating thereon comprising a polymeric polybasic acid selected from the group consisting of polyacrylic acid and polymethacrylic acid partially crosslinked with pentaerythritol so that from 10 to 70% of the acid groups of the polymeric polybasic acid are free acid groups.

15. An article comprising a substrate having an antistatic, soil resistant coating thereon comprising a polymeric polybasic acid containing acidic groups selected from the class consisting of $-COOH$, $-SO_3H$ and $-PO_4H_2$, at least 10% of said acidic groups being carboxyl, said polymeric polybasic acid having a ratio of carbon atoms to acidic groups in the repeat unit in the range of 2:1 to 20:1, and having a molecular weight of 500 to 750,000, said polymeric polybasic acid being partially cross-linked with a compound selected from the group consisting of polyols and polyepoxides so that 10 to 70% of the acid groups of the crosslinked polymeric polybasic acid are free acid groups.

References Cited by the Examiner

UNITED STATES PATENTS

| | | | |
|---|---|---|---|
| 2,169,250 | 8/1939 | Izard | 260—45.5 |
| 2,469,409 | 5/1949 | Powers et al. | 117—161 |
| 2,486,804 | 11/1949 | Seymour et al. | 117—161 |
| 2,609,350 | 9/1952 | Spatt | 117—161 |
| 2,769,727 | 11/1956 | Bowen et al. | 117—139.5 XR |
| 2,773,050 | 12/1956 | Caldwell et al. | 117—161 |
| 2,807,865 | 10/1957 | Shippee et al. | 117—161 |
| 2,899,341 | 8/1959 | Dawson | 117—139.5 |
| 2,954,358 | 9/1960 | Hurwitz | 117—161 |

WILLIAM D. MARTIN, *Primary Examiner.*

RICHARD D. NEVIUS, *Examiner.*